(12) United States Patent
Claes et al.

(10) Patent No.: US 10,578,490 B2
(45) Date of Patent: Mar. 3, 2020

(54) SPECTROMETER AND APPARATUS FOR MEASURING BIOLOGICAL COMPONENT USING THE SAME

(71) Applicants: SAMSUNG ELECTRONICS CO., LTD., Suwon-si (KR); IMEC VZW, Leuven (BE)

(72) Inventors: Tom Claes, Leuven (BE); Sung Mo Ahn, Yongin-si (KR); Woo Chang Lee, Anyang-si (KR)

(73) Assignees: SAMSUNG ELECTRONICS CO., LTD., Suwon-si (KR); IMEC VZW, Leuven (BE)

( * ) Notice: Subject to any disclaimer, the term of this patent is extended or adjusted under 35 U.S.C. 154(b) by 0 days.

(21) Appl. No.: 15/870,281

(22) Filed: Jan. 12, 2018

(65) Prior Publication Data
US 2018/0217002 A1 Aug. 2, 2018

(30) Foreign Application Priority Data
Feb. 2, 2017 (KR) .................... 10-2017-0015117

(51) Int. Cl.
| | |
|---|---|
| G01J 3/45 | (2006.01) |
| G01J 3/28 | (2006.01) |
| G01J 3/02 | (2006.01) |
| G01J 3/44 | (2006.01) |
| G01J 3/26 | (2006.01) |

(52) U.S. Cl.
CPC ............ G01J 3/45 (2013.01); G01J 3/0256 (2013.01); G01J 3/26 (2013.01); G01J 3/2803 (2013.01); G01J 3/44 (2013.01)

(58) Field of Classification Search
CPC ....................... G01J 3/0256; G02B 6/29335
See application file for complete search history.

(56) References Cited

U.S. PATENT DOCUMENTS

| | | | | |
|---|---|---|---|---|
| 4,469,397 A | * | 9/1984 | Shaw .................... | G01J 3/26 385/11 |
| 4,852,960 A | * | 8/1989 | Alferness ........... | G02B 6/12007 385/37 |
| 5,471,551 A | * | 11/1995 | Kragl ................. | G02B 6/12004 385/30 |
| 5,915,051 A | * | 6/1999 | Damask ............. | G02B 6/12007 385/14 |
| 6,640,034 B1 | | 10/2003 | Charlton et al. | |
| 6,735,368 B2 | | 5/2004 | Parker et al. | |
| 6,778,746 B2 | | 8/2004 | Charlton et al. | |

(Continued)

FOREIGN PATENT DOCUMENTS

| | | |
|---|---|---|
| EP | 1 434 069 B1 | 6/2008 |
| EP | 2 913 663 A1 | 9/2015 |

(Continued)

OTHER PUBLICATIONS

Communication dated Jul. 13, 2018, issued by the European Patent Office in counterpart European Application No. 18154715.9.

*Primary Examiner* — Shawn Decenzo
(74) *Attorney, Agent, or Firm* — Sughrue Mion, PLLC

(57) ABSTRACT

A spectrometer is provided. The spectrometer may include an image sensor including a pixel array; and a photonics layer disposed on the pixel array and including a plurality of resonators and a plurality of couplers evanescently coupled to the plurality of resonators.

17 Claims, 13 Drawing Sheets

(56) References Cited

U.S. PATENT DOCUMENTS

| | | | |
|---|---|---|---|
| 6,788,863 B2 | 9/2004 | Parker et al. | |
| 6,901,194 B2 | 5/2005 | Charlton et al. | |
| 7,103,407 B2 | 9/2006 | Hjelt et al. | |
| 7,120,334 B1* | 10/2006 | Greiner | G02B 6/12007 |
| | | | 385/37 |
| 7,133,710 B2 | 11/2006 | Acosta et al. | |
| 7,145,660 B2* | 12/2006 | Margalit | G01N 21/45 |
| | | | 356/477 |
| 7,194,157 B2* | 3/2007 | Jones | G02B 6/12007 |
| | | | 385/30 |
| 7,299,080 B2 | 11/2007 | Acosta et al. | |
| 7,397,994 B2 | 7/2008 | Noda et al. | |
| 7,512,298 B2* | 3/2009 | Yi | G01N 21/7746 |
| | | | 356/337 |
| 7,570,849 B2 | 8/2009 | Spillane et al. | |
| 8,174,394 B2 | 5/2012 | Ridder et al. | |
| 8,346,031 B2 | 1/2013 | Choi et al. | |
| 8,355,767 B2 | 1/2013 | Hunter et al. | |
| 8,599,301 B2 | 12/2013 | Dowski, Jr. et al. | |
| 8,731,017 B2 | 5/2014 | Clifton et al. | |
| 9,240,511 B2 | 1/2016 | Lee et al. | |
| 9,575,256 B2* | 2/2017 | Li | |
| 9,709,442 B2 | 7/2017 | Lee et al. | |
| 9,921,106 B1* | 3/2018 | Davis | G01J 3/2823 |
| 2006/0051042 A1 | 3/2006 | Noda et al. | |
| 2006/0285792 A1 | 12/2006 | Spillane et al. | |
| 2011/0075963 A1 | 3/2011 | Choi et al. | |
| 2011/0273709 A1 | 11/2011 | Sweeney | |
| 2013/0090537 A1 | 4/2013 | Schemmann et al. | |
| 2013/0251378 A1* | 9/2013 | Ahn | H04B 10/25756 |
| | | | 398/141 |
| 2013/0279849 A1* | 10/2013 | Santori | G02B 6/12016 |
| | | | 385/30 |
| 2014/0031952 A1 | 1/2014 | Harshbarger et al. | |
| 2014/0201988 A1 | 7/2014 | Wang et al. | |
| 2014/0233883 A1* | 8/2014 | Sweeney | G02B 6/29343 |
| | | | 385/14 |
| 2014/0253917 A1* | 9/2014 | Heidrich | G01N 21/39 |
| | | | 356/300 |
| 2014/0362374 A1* | 12/2014 | Santori | G01J 3/1895 |
| | | | 356/301 |
| 2014/0376000 A1* | 12/2014 | Swanson | G01B 9/02091 |
| | | | 356/479 |
| 2015/0053980 A1 | 2/2015 | Lee et al. | |
| 2016/0202119 A1 | 7/2016 | Lee | |
| 2016/0238447 A1* | 8/2016 | Cho | G01J 3/0224 |
| 2016/0238860 A1 | 8/2016 | Liang et al. | |
| 2016/0265974 A1* | 9/2016 | Ertel | G01N 21/31 |
| 2016/0356720 A1* | 12/2016 | Van Dorpe | A61B 5/0066 |
| 2017/0153143 A1* | 6/2017 | Kim | G01J 3/1895 |
| 2017/0167921 A1* | 6/2017 | Lee | G01J 3/18 |
| 2017/0331550 A1* | 11/2017 | Liu | H04B 10/07957 |
| 2018/0059412 A1* | 3/2018 | Favero | G02B 6/12007 |
| 2018/0106671 A1* | 4/2018 | Claes | G01J 3/4531 |
| 2018/0274926 A1* | 9/2018 | Wang | G01C 19/72 |

FOREIGN PATENT DOCUMENTS

| | | |
|---|---|---|
| EP | 3187845 A1 | 7/2017 |
| JP | 3568943 B2 | 9/2004 |
| KR | 10-2010-0005452 A | 1/2010 |
| KR | 10-0959426 B1 | 5/2010 |
| KR | 10-1061520 B1 | 9/2011 |
| KR | 10-1529660 B1 | 6/2015 |
| KR | 10-2016-0087223 A | 7/2016 |
| WO | 2015/057210 A1 | 4/2015 |

* cited by examiner

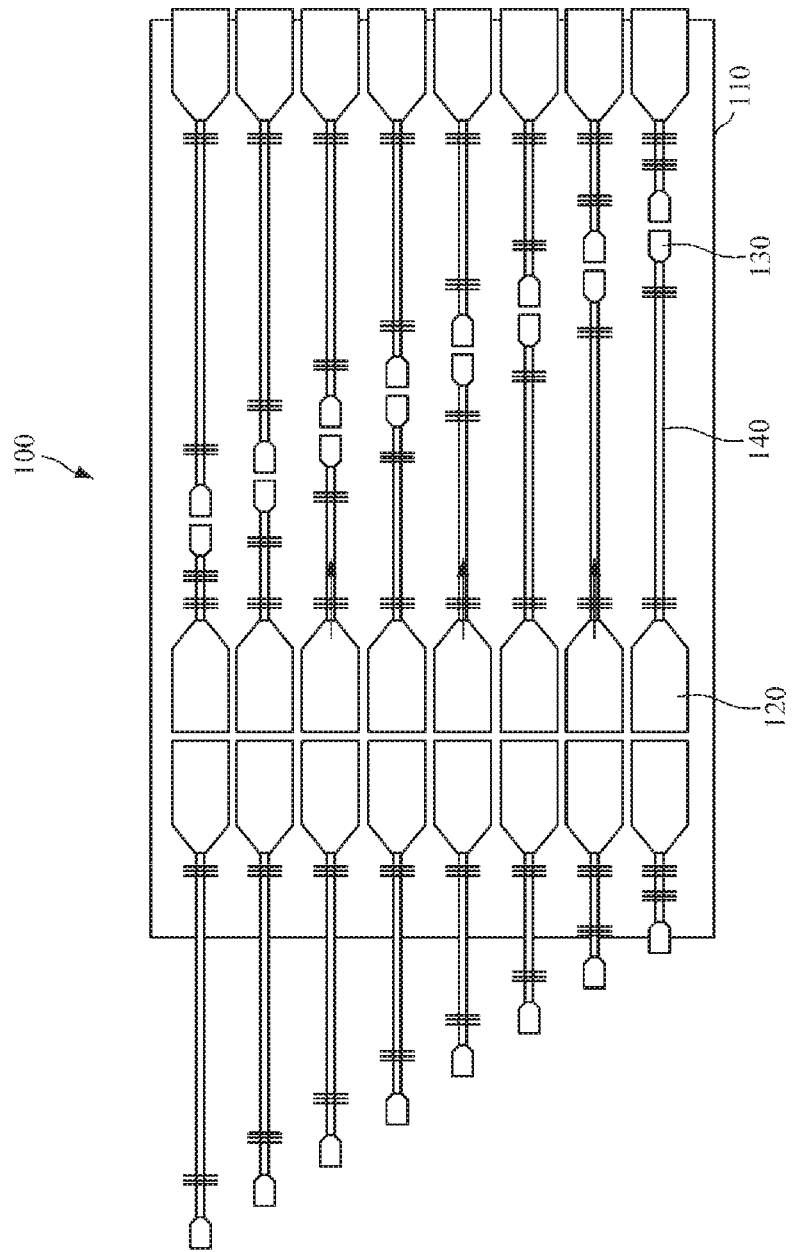

RELATED ART

SPECTROMETER AND APPARATUS FOR MEASURING BIOLOGICAL COMPONENT USING THE SAME

CROSS-REFERENCE TO RELATED APPLICATION

This application claims priority from Korean Patent Application No. 10-2017-0015117, filed on Feb. 2, 2017, in the Korean Intellectual Property Office, the disclosure of which is incorporated herein by reference in its entirety.

BACKGROUND

1. Field

Apparatuses and methods consistent with exemplary embodiments relate to a spectrometer and a component measurement apparatus for measuring a component in an object using the spectrometer.

2. Description of Related Art

Recently, methods of non-invasively measuring in vivo components, such as blood glucose, using Raman spectroscopy or near-infrared (NIR) spectroscopy have been studied. Devices employing the spectroscopy technology may include a collimator for collecting an optical signal returning from the skin of an object, a spectrometer for analyzing the wavelength of the optical signal, and an interface between the collimator and the spectrometer, for example, a beam shaper. The spectrometer may include an image sensor formed by a number of pixels and a photonics layer disposed on the image sensor.

SUMMARY

According to an aspect of an exemplary embodiment, there is provided a spectrometer including: an image sensor comprising a pixel array; and a photonics layer disposed on the pixel array and comprising a plurality of resonators and a plurality of couplers evanescently coupled to the plurality of resonators.

The plurality of couplers may include: an in-coupler to which light may be input; and an out-coupler which may be connected to the in-coupler and may output the light transmitted from the in-coupler to a pixel of the pixel array.

The in-coupler and the out-coupler may correspond to grating coupler, metal mirrors, or a grating coupler and a metal mirror.

At least two couplers of the plurality of couplers may be arranged in succession in each row of the pixel array, and out-couplers of the at least two couplers in each row of the pixel array may be located at same column positions.

Each of the plurality of couplers may be disposed separately from the plurality of resonators to generate an evanescent coupling between the plurality of couplers and the plurality of resonators.

The plurality of resonators may be Fabry-Perot resonators.

The photonics layer may include a plurality of detection areas, the plurality of resonators disposed in one of the plurality of detection areas may include at least two types of resonators having at least two different wavelength characteristics.

The at least two types of resonators may be alternately arranged in each row of the pixel array.

The at least two types of resonators may be arranged in-series on a boundary line of each row of the pixel array.

The plurality of resonators may include at least two types of resonators having two wavelength characteristics.

According to an aspect of another exemplary embodiment, there is provided an apparatus for measuring a substance in body, the apparatus including: a light source configured to emit light to an object; and a spectrometer configured to sense the light returning from the object, wherein the spectrometer may include: a pixel array; and a photonics layer disposed on the pixel array and comprising a plurality of resonators and a plurality of couplers evanescently coupled to the plurality of resonators.

The apparatus may further include a main body in which the light source and the spectrometer are mounted.

The apparatus may further include a strap connected to the main body and formed to be flexible so as to wrap around the object.

The apparatus may further include a signal processor configured to analyze a substance of the object using a signal sensed by the spectrometer.

The apparatus may further include a display configured to display an analysis result obtained by the signal processor.

The apparatus may further include a communication interface configured to transmit the analysis result of the signal processor to an external device.

The light source may emit a near-infrared laser or a visible light laser.

The plurality of couplers may include: an in-coupler to which the light is input; and an out-coupler which is connected to the in-coupler and outputs the light transmitted from the in-coupler to a pixel of the pixel array.

The at least two couplers of the plurality of couplers may be arranged in each row of the pixel array so as to be aligned to a pixel pitch.

The plurality of resonators comprise at least two types of resonators having at least two wavelength characteristics.

According to an aspect of another exemplary embodiment, there is provided a spectrometer including: a pixel array; and a phonics layer that is disposed on the pixel array and comprises: an in-coupler that receives light; an out-coupler that outputs the light transmitted from the in-coupler; an evanescent coupler that is disposed between the in-coupler and the out-coupler to guide the light received from the in-coupler to the out-coupler; and a resonator that extends in a direction from the in-coupler to the out-coupler, and is disposed apart from the in-coupler and the out-coupler to generate an evanescent coupling between the resonator and the evanescent coupler.

The evanescent coupler may extend from the in-coupler to the out-coupler and may curve so that distance between the resonator and the evanescent coupler varies.

The photonic layer may include a first coupler set and a second coupler set within a illumination pitch of the spectrometer, the first coupler set may include a first in-coupler, a first out-coupler, and a first evanescent coupler that respectively correspond to the in-coupler, the out-coupler, and the evanescent coupler, the second coupler set may include a second in-coupler, a second out-coupler, and a second evanescent coupler, and the first coupler set and the second coupler set may be disposed in series.

The resonator may correspond to a first resonator. The photonic layer may include: the first resonator that is aligned with the first coupler set; and a second resonator that is aligned with the second coupler set and disposed in series with the first resonator. The second resonator may have a wavelength characteristic different from a wavelength characteristic of the first resonator.

BRIEF DESCRIPTION OF THE DRAWINGS

The above and/or other aspects will be more apparent by describing certain exemplary embodiments, with reference to the accompanying drawings, in which:

FIGS. 1A and 1B are diagrams illustrating a structure of a general spectrometer.

DETAILED DESCRIPTION

Figure 1B:
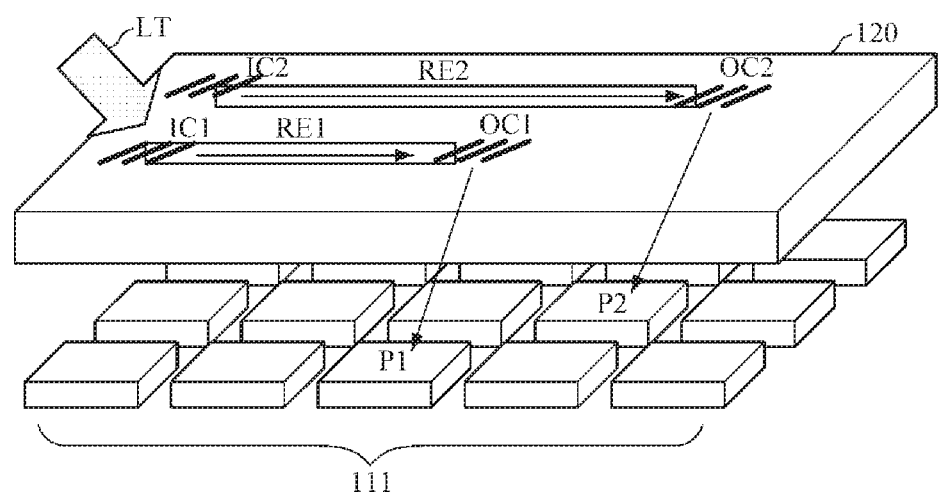

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. In the specification, unless explicitly described to the contrary, the word "comprise" and variations such as "comprises" or "comprising", will be understood to imply the inclusion of stated elements but not the exclusion of any other elements. Terms such as " . . . unit" and "module" denote units that process at least one function or operation, and they may be implemented by using hardware, software, or a combination of hardware and software.

Expressions such as "at least one of," when preceding a list of elements, modify the entire list of elements and do not modify the individual elements of the list.

FIGS. 1A and 1B are diagrams illustrating a structure of a general spectrometer.

Referring to FIGS. 1A and 1B, a spectrometer 100 includes an image sensor 110 formed of a pixel array 111 and a photonics layer 120 disposed on the image sensor 110. In particular, the photonics layer may include a plurality of detection channels, in each of which an in-coupler 121, a transmission system 122, and an out-coupler 123 are coupled in series.

The in-coupler 121 couples external light. For example, when a light source of a device for measuring a biological component emits light to an object, the light is reflected or scattered by the skin of the object and returns to the device. The in-coupler 121 receives the returning light and transmits the light to the out-coupler 123. In particular, the light input to the in-coupler 121 is spectrally separated through the transmission system 122 and the separated light is transmitted to the out-coupler 123. The out-coupler 123 outputs the transmitted light to a corresponding pixel of the image sensor 110 to be detected. The transmission system 122 may be formed of a Fabry-Perot resonator having various wavelength characteristics. Spectral wavelength characteristics of a general interferometer spectrometer depend on the length of the resonator.

Referring to FIG. 1B, two detection channels are arranged on the photonics layer 120 in the structure of the general spectrometer 100. A first detection channel includes an in-coupler IC1, a transmission system RE1, and an out-coupler OC1, and both ends of the transmission system RE1 are connected to the in-coupler IC1 and the out-coupler OC1. The out-coupler OC1 of the first detection channel is disposed corresponding to a position of pixel P1 of the pixel array 111, and light LT input to the in-coupler IC1 is separated through the transmission system RE1 so that light of a specific wavelength is output to the pixel P1 of the image sensor 110 through the out-coupler OC1.

The second detection channel includes an in-coupler IC2, a transmission system RE2, and an out-coupler OC2, and both ends of the transmission system RE2 are connected to the in-coupler IC2 and the out-coupler OC2. The out-coupler OC2 of the second detection channel is disposed corresponding to a position of pixel P2 of the pixel array 111, and light input to the in-coupler IC2 and spectrally separated through the transmission system RE2 is output to the pixel P2 through the out-coupler OC2. In this case, the transmission system RE2 of the second detection channel is formed to have a length different from that of the transmission system RE1 of the first detection channel so as to have a different spectral wavelength characteristic from the transmission system RE1.

In the structure of the general spectrometer 100, since both ends of the transmission system 122 which spectrally separates light are directly coupled in series to the in-coupler 121 and the out-coupler 123, the length of the transmission system 122 is required to be adjusted in order to have various wavelength characteristics. In particular, when the length of the transmission system 122 is adjusted, the position of the out-coupler 123 that is directly coupled to the transmission system 122 may be changed. However, if the position of the out-coupler 123 is not precisely aligned to the corresponding pixel of the image sensor 110, light loss may occur and the of resolution and optical efficiency of the spectrometer may be deteriorated.

Figure 2:
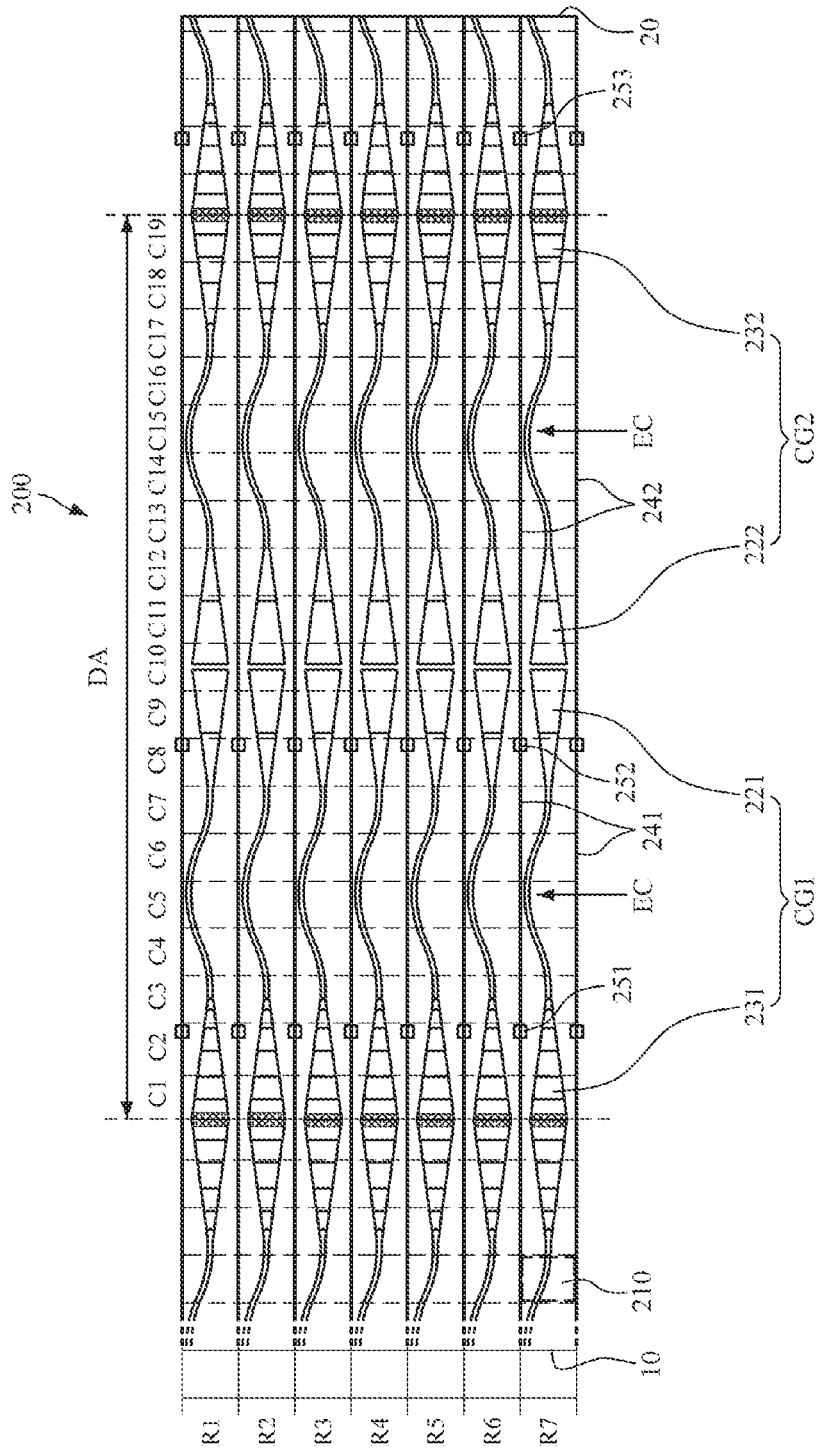
FIG. 2 is a diagram illustrating a structure of a spectrometer according to an exemplary embodiment.

FIG. 2 is a diagram illustrating a structure of a spectrometer according to an exemplary embodiment. The structure of the spectrometer 100 may represent an exemplary embodiment of a Raman spectrometer structure which detects laser light of a single wavelength and analyzes an absorption spectrum, but is not limited thereto.

Referring to FIG. 2, the spectrometer 200 according to an exemplary embodiment includes an image sensor 10 to detect light and a photonics layer 20 to spectrally separate external light and output the light to the image sensor 10. As shown in FIG. 2, the image sensor 10 having a constant size is formed of an array of a plurality of pixels 210, and the photonics array 10 is disposed on the pixel array of the image sensor 10. For example, the image sensor 10 may be realized as a charge-coupled device (CCD) or a complementary metal-oxide-semiconductor (CMOS) image sensor (CIS), but is not limited thereto.

The photonics layer 20 may include one or more detection areas DA. For example, FIG. 2 illustrates that an area formed by 7 rows R1 to R7 and 19 columns C1 to C19 of the pixel array is set as one DA, but the number of rows and the size of DA are not limited to what is illustrated in the embodiments, and may be adjusted according to various criteria, such as the size of the image sensor, the spectral resolution, and the size of pixel pitch.

In each DA, a plurality of resonators 241 and 242 and a plurality of couplers CG1 and CG2 are arranged. The resonators 214 and 242 and the couplers CG1 and CG2 are individually formed and arranged on the pixel array so that positions of the couplers CG1 and CG2 are not changed according to the lengths of the resonators 241 and 242 which determine the spectral wavelength characteristics. In addition, the resonators 241 and 242 and the couplers CG1 and CG2 are evanescently coupled to each other as shown in FIG. 2 (see evanescent coupler EC). The term "evanescent coupling" may refer to a coupling between a pair of an in-coupler and an out-coupler and a resonator, without a direction connection or contact between the in-coupler/out-coupler and the resonator, while the in-coupler/out-coupler is placed at a fixed position in relation to pixels. The evanescent coupling may occur due to a round shape of the in-coupler and the out-coupler. The strength of the evanescent coupling may be weaker than a coupling between a conventional transmission system and a conventional in-coupler/out-coupler, which are directly connected to each other. The resonators 241 and 242 may be realized as Fabry-Perot resonators according to an exemplary embodiment.

As shown in FIG. 2, the bent or curved shape of the evanescent coupler EC may allow the couplers 221, 222, 231, and 232 to be evanescently coupled with the resonators 241 and 242. The evanescent coupler EC may have a length longer than the distance between an in-coupler 221 and an out-coupler 231 and may include one or more rounded bends.

The couplers CG1 and CG2 include in-couplers 221 and 222 and out-couplers 231 and 232, respectively, wherein external light is input to the in-couplers 221 and 222 and the out-couplers 231 and 232 output the light input to the in-couplers 221 and 222 to corresponding pixels. For example, the in-couplers 221 and 222 and the out-couplers 231 and 232 may be grating couplers or metal mirrors. For example, when light input to the in-coupler 221 is transmitted to the out-coupler 231, light of a specific wavelength characteristic corresponding to the resonance mode of the resonator 241 evanescently coupled to the in-coupler 221 is coupled and the light of remaining wavelength characteristics is output to a pixel of the image sensor through the out-coupler 231. In other words, when a light is transmitted from the in-coupler 221 to the out-coupler 231, an intended wavelength according to the length of the resonator 241 escapes to the resonator 241 and the rest of the wavelengths of the light are transmitted to the out-coupler 231. Similarly, when a light is transmitted from the in-coupler 222 to the out-coupler 232, an intended wavelength according to the length of the resonator 242 escapes to the resonator 242 and the rest of the wavelengths of the light are transmitted to the out-coupler 232. The intended wavelengths according to the lengths of the resonators 241 and 242 may refer to resonant wavelengths of the resonators 241 and 242.

Meanwhile, each of the couplers CG1 and CG2 is repeatedly arranged in each row of the pixel array of the image sensor 10, and at least two couplers CG1 and CG2 may be arranged in succession in each row of each of the DAs, as shown in FIG. 2. In particular, a first coupler CG1 and a second coupler CG2, which are arranged in succession in each row, may have the same size. However, the present exemplary embodiment is not limited thereto, such that the first coupler CG1 and the second coupler CG2 may be arranged to have different sizes according to the size of DA or the lengths of the resonators 241 and 242 which are evanescently coupled.

In addition, in each of the DAs, at least two types of resonators 241 and 242 having different wavelength characteristics may be repeatedly arranged in series in each row of the pixel array of the image sensor 10. In this case, a first resonator 241 and a second resonator 242, which have different wavelength characteristics, may be alternately arranged side-by-side on a boundary line of each row of the pixel array of the image sensor 10. The first resonator 241 and the second resonator 242 may be formed to have different lengths by adjusting the positions of mirrors 251, 252, and 253 connected to both ends of each of the resonators 241 and 242 so that the first resonator 241 and the second resonator 242 have different wavelength characteristics. The positions of the mirrors 251, 252, and 253 are determined according to the wavelength characteristics of the first and second resonators 241 and 242, regardless of the positions of the in-couplers 221 and 222 and the out-couplers 231 and 232 or the pixels of the image sensor 10. In this case, the wavelength characteristics of the resonators may be determined in advance according to the purpose of analysis, the size of the image sensor, the size of the pixel pitch, and the like.

As shown in FIG. 2, the first resonator 241 extends in a direction from the in-coupler 221 to the out-coupler 231 or from the out-coupler 231 to the in-coupler 221. The second resonator 242 extends in a direction from the in-coupler 222 to the out-coupler 232 or from the out-coupler 232 to the in-coupler 222. The first resonator 241 is spaced apart from the evanescent coupler EC that is connected between the in-coupler 221 and the out-coupler 231. Since the evanescent coupler EC is curved and bent, the distance between the evanescent coupler EC and the first resonator 241 may vary in the direction from the in-coupler 221 to the out-coupler 231. The second resonator 242 is spaced apart from the evanescent coupler EC that is connected between the in-coupler 222 and the out-coupler 232, and the distance between the evanescent coupler EC and the second resonator 242 may vary in the direction from the in-coupler 222 to the out-coupler 232.

According to the exemplary embodiment, it is possible to repeatedly arrange the resonators having two kinds of different wavelength characteristics in each DA, and it is also possible to arrange resonators having different wavelength characteristics from one DA to another DA so that each DA may detect light having various wavelength characteristics.

For example, in a case where one pixel pitch is 5.5 µm, and 19 pixels C1 to C19, which has a total length of 104.5 µm, is set as one detection area on the image sensor 10, two couplers CG1 and CG2 may be repeatedly arranged in succession in each of rows R1 to R7. In this case, the positions of the in-coupler 221 and the out-coupler 231 of the first coupler CG1 may be disposed to be aligned to pixels in the same column of the pixel array of the image sensor 10. In a similar manner, the positions of the in-coupler 222 and the out-coupler 232 of the second coupler CG2 may be disposed to be aligned to pixels in the same column of the pixel array of the image sensor 10.

Resonators having 85 different lengths having an interval variation ΔL of 0.97 μm in a range of a minimum interval Lmin of 10 μm to a maximum interval Lmax of 91.48 μm may be uniformly arranged in all DAs so that each DA has a different wavelength characteristic. The minimum interval Lmin may refer to a predetermined minimum length of the resonators to be arranged in the DA. The maximum interval Lmax may refer to a predetermined maximum length of the resonators to be arranged in the DA. The interval variation ΔL may refer to a predetermined variation of the lengths of the resonators. According to an exemplary embodiment, the size of the DA may be fixed while the lengths of the resonators in the DA may vary. The illumination pitch of the photonics layer 20 may be equal to the length of the DA. For each length of the resonators, 8200 identical structures may be repeatedly arranged in the pixel array of the image sensor. However, the examples are not limited to the above description, and may be changed according to the size of the image sensor, the size of pixel pitch, the size of DA, the range of the length of the resonators, the interval of the resonance length, and the like.

Figure 3A:
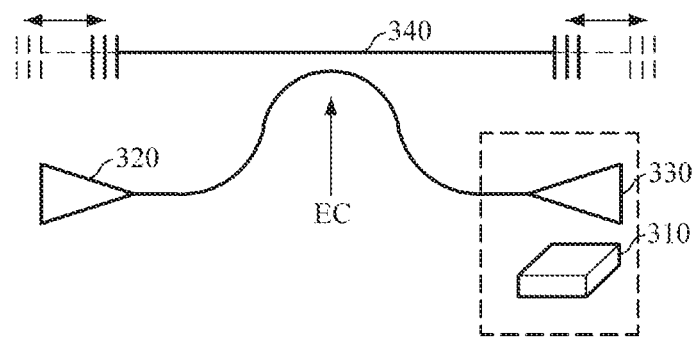
FIGS. 3A and 3B are diagrams for describing a structure of a spectrometer according to an exemplary embodiment.
Figure 3B:
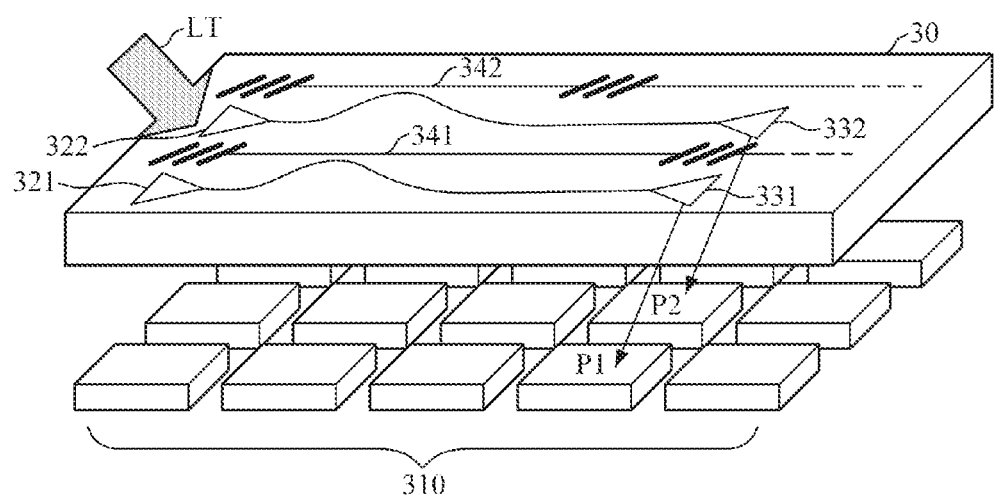

FIGS. 3A and 3B are diagrams for describing a structure of a spectrometer according to an exemplary embodiment.

FIG. 3A illustrates a concept of arranging an out-coupler 330 to be aligned at the location of a specific pixel 310 of a pixel array, regardless of a length of a resonator 340. As shown in FIG. 3A, an in-coupler 320 and the out-coupler 330 are evanescently coupled to the resonator 340 so as to be arranged on the specific pixel 310, and in this case, the length of the resonator 340 may be adjusted according to an output wavelength of the evanescently coupled out-coupler 330. As such, the out-coupler 330 is arranged to be aligned at the location of the pixel 310 of the pixel array, regardless of the length of the resonator 340, so that various spectral elements (e.g., a metal blocking layer), can be integrated into a photonics layer.

FIG. 3B schematically illustrates a structure of a spectrometer in which pairs of the in-couplers 321 and 322 and the out-couplers 331 and 332, which are arranged at specific pixel locations, are evanescently coupled to resonators 341 and 342 having different lengths. For convenience of description, the two resonators 341 and 342, the in-couplers 321 and 322 and the out-couplers 331 and 332 are illustrated, but the numbers of these elements are not particularly limited. As shown in FIG. 3B, the resonators 341 and 342 may be arranged to have different lengths according to spectral wavelength characteristics. In addition, the in-couplers 321 and 322 and the out-couplers 331 and 332, which are evanescently coupled to the respective resonators 341 and 342, and particularly, the out-couplers 331 and 332 are evanescently coupled to the respective resonators 341 and 342, so that the out-couplers 331 and 332 can be arranged at pixels P1 and P2 in the same column.

As such, according to the present exemplary embodiment, the in-couplers and out-couplers are arranged at specific positions to be aligned to pixels of the image sensor and the in-couplers and the out-couplers are evanescently coupled to the resonators, so that integration of the resonators having various lengths, which are factors affecting the spectral resolution and spectrum reconstruction performance is possible.

Figure 4A:
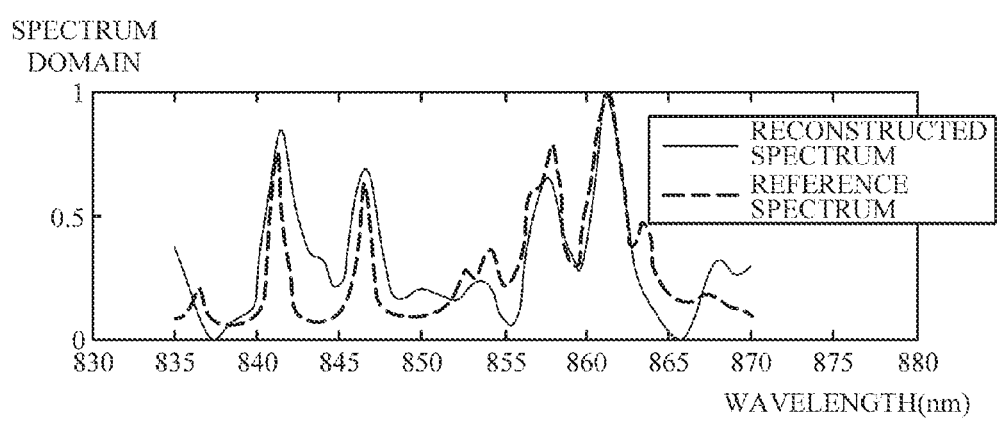
FIGS. 4A, 4B, and 4C are graphs for describing a spectrum reconstruction performance according to an exemplary embodiment.
Figure 4B:
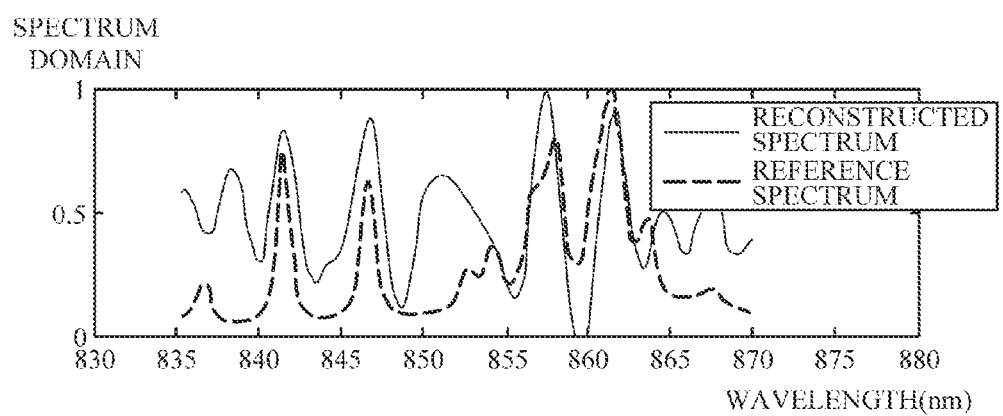
Figure 4C:
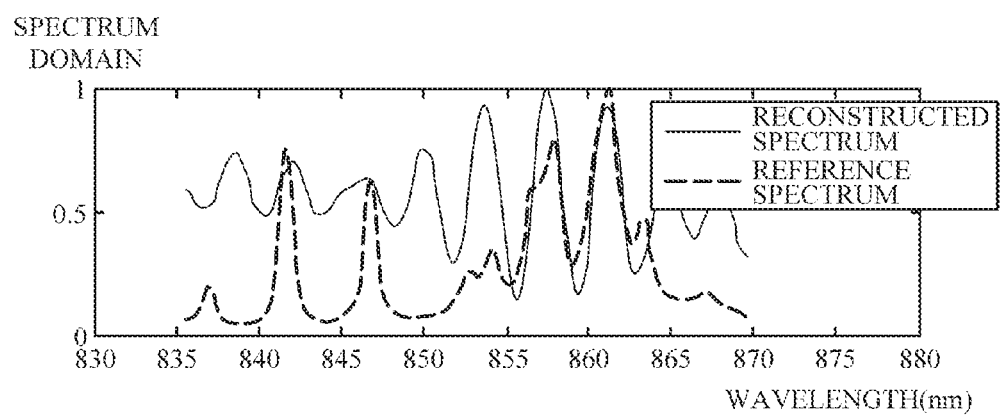

FIGS. 4A to 4C are graphs for describing a spectrum reconstruction performance according to an exemplary embodiment.

FIG. 4A shows a spectrum reconstruction performance in the case where resonators having lengths in range of minimum of 10 μm to maximum of 90 μm are integrated into a photonics layer, wherein a cosine similarity between a reconstructed spectrum and a reference spectrum is 0.915.

FIG. 4B shows a spectrum reconstruction performance in the case where resonators having lengths in range of minimum of 30 μm to maximum of 70 μm are integrated into a photonics layer, wherein the cosine similarity between a reconstructed spectrum and a reference spectrum is 0.833.

FIG. 4C shows a spectrum reconstruction performance in the case where resonators having lengths in range of minimum of 40 μm to maximum of 60 μm are integrated into a photonic layer, wherein the cosine similarity between a reconstructed spectrum and a reference spectrum is 0.807.

As the various resonators having a wider range of lengths are arranged on the photonics layer, the spectral resolution and the spectrum reconstruction performance are increased. In the present exemplary embodiment, as described above, the interval of the in-couplers and the out-couplers are maintained constantly on the pixels, so that resonators having a wide range of various lengths can be integrated and hence the spectral performance can be improved.

Figure 5:
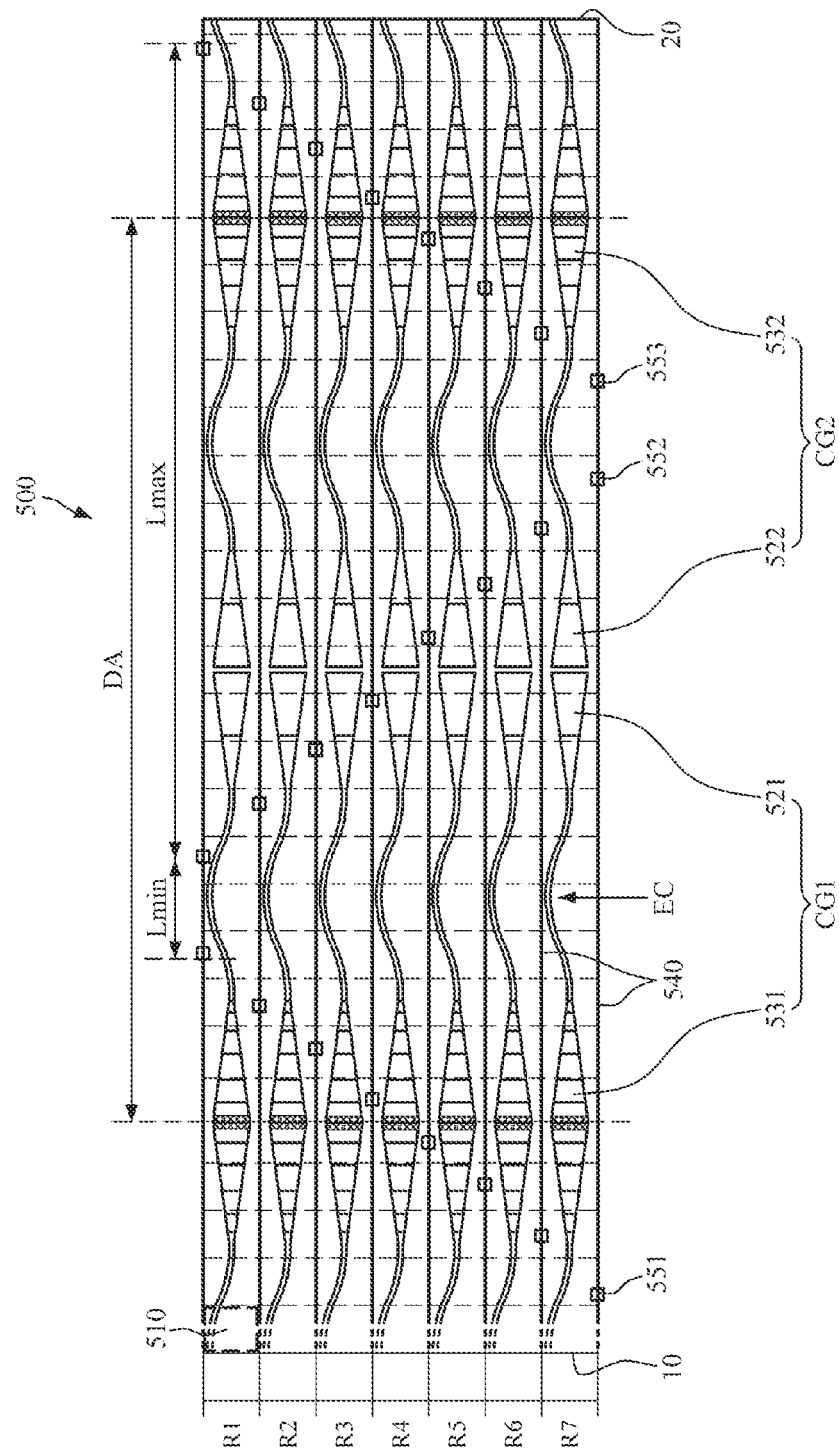
FIG. 5 is a diagram illustrating a schematic structure of a spectrometer according to another exemplary embodiment.

FIG. 5 is a diagram illustrating a schematic structure of a spectrometer according to another exemplary embodiment.

Referring to FIG. 5, in the structure of the spectrometer 500 according to the present exemplary embodiment, a photonics layer 20 on which various spectral elements are arranged is disposed on the image sensor 10 which detects light as in the structure of the above-described spectrometer 200. The photonics layer 20 may include one or more detection areas DAs, and each of the DAs includes a plurality of couplers CG1 and CG2 and a plurality of resonators 540 evanescently coupled to the respective couplers CG1 and CG2, which are arranged on an array of pixels 510 of the image sensor 10.

In the structure of the spectrometer 500 according to the present exemplary embodiment, the spectral elements of the photonics layer 20 may be disposed such that all of the DAs have the same wavelength characteristics, unlike the structure of the spectrometer 200 of the embodiment described with reference to FIG. 2. For example, a plurality of couplers CG1 and CG2 may be repeatedly arranged in each row of each of the DAs, and the resonators evanescently coupled to the couplers CG1 and CG2 may be formed to have various lengths and arranged so that the DA has a full spectral wavelength characteristics. In this case, a plurality of different types of resonators may be arranged in each of the DAs in a scrambled manner by variously adjusting the positions of mirrors 551, 552, and 553.

For example, when a pixel pitch is 5.5 μm, and 19 pixels, which has a total length of 104.5 μm, is set as one detection area on the image sensor 10, two couplers CG1 and CG2 are repeatedly arranged in succession in the rows R1 to R7 in each DA, as shown in FIG. 5. In this case, positions of out-couplers 531 and 532 of the respective couplers CG1 and CG2 in each row may be arranged to be placed consistently in the same column. In addition, a plurality of resonators having 85 different lengths at an interval variation ΔL of 0.97 μm in a range of a minimum interval Lmin of 10 μm to a maximum interval Lmax of 91.48 μm may be arranged in each of the DAs in a scrambled manner so that the DAs have the same wavelength characteristics. In this case, a size of one DA may be 0.049 mm² (104.5 μm×5.5 μm×85) and the number of DAs may depend on the size of the entire image sensor 10.

As described above, a plurality of different types of resonators are arranged on the photonics layer 20 in a scrambled form, so that it is possible to minimize the effect of optical nonuniformity, which may occur in the entire image sensor 10, and thereby reduce the resulting degradation of spectral performance.

Figure 6A:
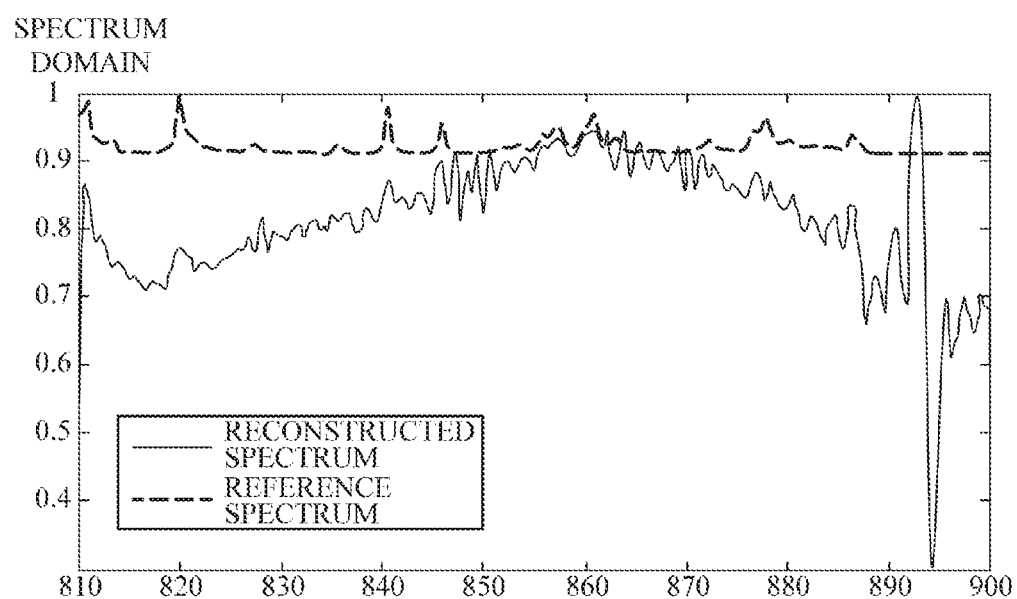
FIGS. 6A and 6B are graphs for describing a spectrum reconstruction performance according to an exemplary embodiment.
Figure 6B:
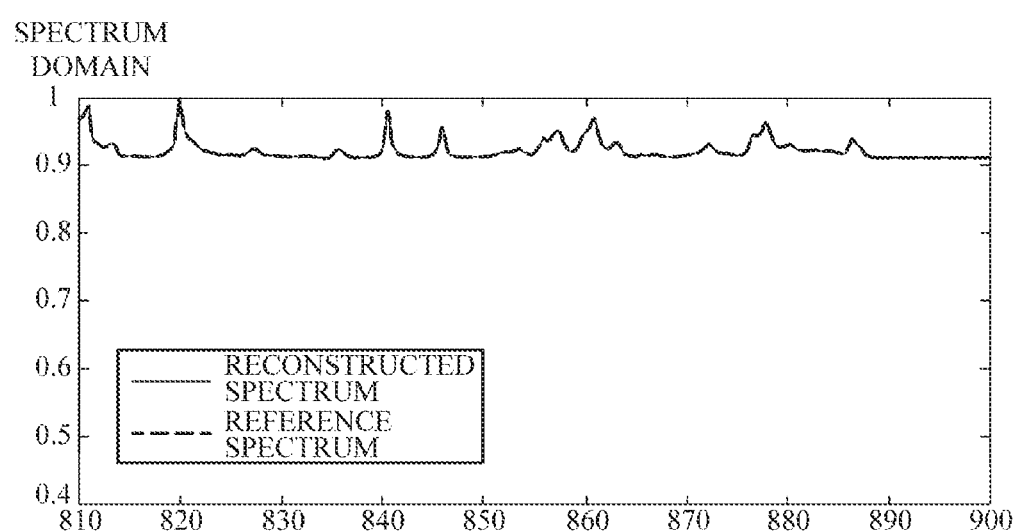

FIGS. 6A and 6B are graphs for describing a spectrum reconstruction performance according to an exemplary embodiment.

FIG. 6A shows a spectrum reconstruction performance in the case where an interval between lengths of resonators to be arranged on a photonics layer is $\Delta L=0.97$ μm and the resonators having corresponding lengths are integrated into the photonics layer. In this case, a cosine similarity between a reconstructed spectrum and a reference spectrum is 0.994. FIG. 6B shows a spectrum reconstruction performance in the case where an interval between lengths is 0.1 μm, which is relatively shorter than that of FIG. 6A, and resonators having lengths at the intervals are integrated. In this case, the cosine similarity between a reconstructed spectrum and a reference spectrum is 1.

As shown in FIGS. 6A and 6B, according to the present exemplary embodiment, the resonators are separately formed in a state where the positions of in-couplers and out-couplers are maintained at fixed positions and then the resonators are evanescently coupled to the in-couplers and the out-couplers, so that the resonators can be integrated variously at short intervals and hence a signal-to-noise ratio and the spectral resolution can be increased.

Figure 7:
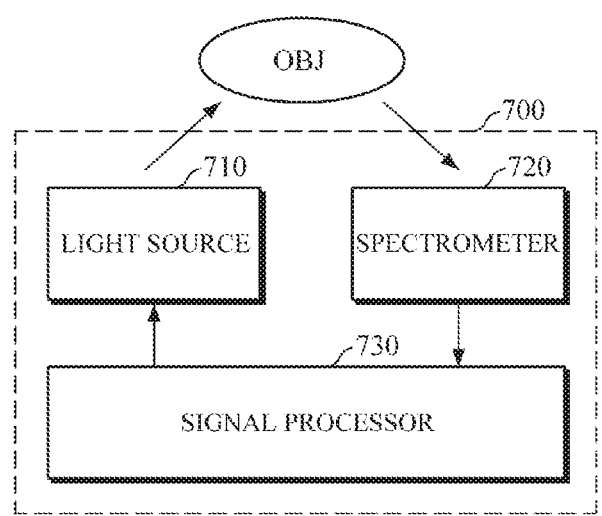
FIG. 7 is a block diagram illustrating an apparatus for measuring a biological component according to an exemplary embodiment.

FIG. 7 is a block diagram illustrating an apparatus for measuring a biological component according to one embodiment.

Referring to FIG. 7, the apparatus 700 for measuring a biological component may include a light source 710, a spectrometer 720, and a signal processor 730.

The light source 710 may emit light to an object OBJ in response to a control signal of the signal processor 730. The light source 710 may be configured to emit a visible light laser or a near-infrared laser so that absorption spectrum can be analyzed by Raman spectroscopy or near-infrared spectroscopy. The light source 710 may be formed by a halogen lamp or a light-emitting diode (LED), but is not limited thereto.

The spectrometer 720 may detect light reflected or scattered from a living tissue of an object OBJ which is irradiated by the light source 710. In this case, the object OBJ may be a human skin or a living body of an animal.

The spectrometer 720 may correspond to the spectrometer 200 or 500 which is described with reference to FIG. 2 or 5. The spectrometer 720 may include an image sensor which emits light and a photonics layer which is stacked on the image sensor and emits light.

The photonics layer includes in-couplers which receive light returning from the object OBJ and out-couplers which are coupled to the in-couplers and output the received light to pixels of the image sensor. In this case, the out-couplers are arranged to be aligned to the pixels of the image sensor so as to minimize light loss.

In addition, the photonics layer includes a plurality of resonators which spectrally separate the light into various wavelength characteristics when the light received by the in-couplers is transmitted to the out-couplers, and the resonators are each formed separately from the in-couplers and the out-couplers and evanescently coupled to the in-couplers and the out-couplers. In this case, the resonators may be Fabry-Perot resonators, and the in-couplers and the out-couplers may be grating couplers.

The photonics layer may include a plurality of detection areas. The in-coupler, the out-coupler and the resonator, which are disposed in each of the detection areas, may be repeatedly arranged in each row of a pixel array of the image sensor.

In addition, different types of resonators may be evenly or uniformly distributed so that each detection area has different wavelength characteristics. Alternatively, the resonators having all wavelength characteristics needed in one detection area may be arranged and the same types of resonators are repeatedly disposed in each detection area so that each detection area has the same wavelength characteristics.

The signal processor 730 may receive an optical signal detected by a pixel of the image sensor and measure a biological component using the received optical signal. For example, the signal processor 730 may reconstruct a Raman spectrum using a Raman optical signal received from the image sensor, distinguish biological components by analyzing the reconstructed Raman spectrum, and obtain information on the concentration of each component. In this case, the biological components may include blood glucose, triglycerides, cholesterol, calories, protein, and uric acid, but are not limited thereto.

In addition, the signal processor 730 may generate an alarm or warning information to be informed to a user on the basis of the biological component measured according to a preset criterion.

The apparatus for measuring a biological component according to the present embodiment may be manufactured in the wearable form including a main body and a strap, which can be worn on the object OBJ. In this case, the wearable form may include a wristwatch type, a bracelet type, a wristband type, a ring type, a glass type, a hairband type, and the like, and the shape or the size thereof are not particularly limited.

The light source 710, the spectrometer 720, and the signal processor 730 may be mounted in a main body. For example, in the case of a wristwatch type, the light source 710 and the spectrometer 720 may be mounted on a lower part of the main body which is in contact with the user's wrist, and the signal processor 730 may be mounted in an inner substrate of the main body and electrically connected to the light source 710 and the spectrometer 720.

The strap may be formed to be flexible to wrap around the object, and if necessary, a battery for supplying power to the main body may be embedded in the strap.

In addition, the apparatus 700 for measuring a biological component may include a separate operation unit. The operation unit may receive a user's command and transmit the received command to the signal processor 730.

Figure 8:
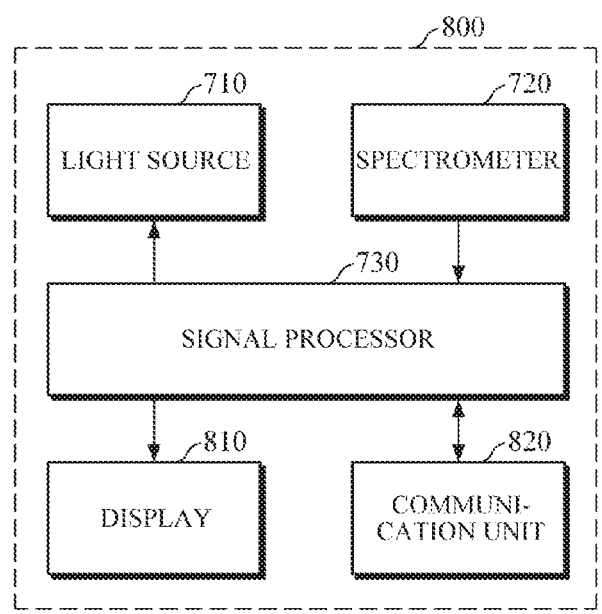
FIG. 8 is a block diagram illustrating an apparatus for measuring a biological component according to another exemplary embodiment.

FIG. 8 is a block diagram illustrating an apparatus for measuring a biological component according to another exemplary embodiment.

Referring to FIG. 8, the apparatus 800 for measuring a biological component may include a light source 710, a spectrometer 720, a signal processor 730, a display 810, and a communication unit (e.g., communication interface) 820. Configurations of the light source 710, the spectrometer 720, and the signal processor 730 are described with reference to FIG. 7, and hence hereinafter, the description will be given with focus on configurations of the display 810 and the communication unit 820.

The display 810 is mounted in a main body and outputs a variety of information under the control of the signal processor 730. In particular, the display 810 may display information about biological component measured by the signal processor 730 or health status information, warning or alarm information, or the like, which is related to the measured biological component, and display such information to the user using various visual display methods.

The display 810 may include a touch module allowing a user to perform touch input. The display 810 may output an interface for interaction with the user, receive a command received through the interface from the user, and transmit the received command to the signal processor 730.

The communication unit 820 may be mounted in the main body, and transmit and receive data to and from an external device using various communication technologies in response to a control signal of the signal processor. In this case, the communication technologies may include Bluetooth communication, Bluetooth low energy (BLE) communication, near-field communication (NFC), wireless local area network (WLAN) communication, ZigBee communication, infrared data association (IrDA) communication, Wi-Fi direct (WFD) communication, ultra-wideband (UWB) communication, Ant+ communication, Wi-Fi communication, and third generation (3G), fourth generation (4G) and fifth generation (5G) communication technologies, but are not limited thereto.

For example, the communication unit 820 may be connected to the external device for communication, and transmit a measured sensor signal, biological component information, or the like. In this case, the external device may include a smartphone, a smart pad, a desktop computer, a notebook computer, and other information processing device, which has superior computing performance relative to the apparatus 800 for measuring a biological component. However, the type of external device is not limited to the above examples. In this way, the apparatus 800 for measuring a biological component may be fabricated in a small size and measure the biological component information, while the external device is allowed to manage a variety of information using the biological component information, for example, a user's biological component measurement history, statistical information, such as health status analysis and change history information according to the biological component measurement, and provide the information in various ways such as a graph.

In addition, the communication unit 820 may receive reference information, such as reference blood glucose value, for calibration of the apparatus 800 from the external device and transfer the information to the signal processor 730.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A spectrometer comprising:
  an image sensor comprising a pixel array; and
  a photonics layer disposed on the pixel array and comprising a plurality of resonators, mirrors that are respectively disposed at two ends of each of the plurality of resonators, and a plurality of couplers disposed apart from and evanescently coupled to the plurality of resonators,
  wherein the photonics layer comprises a plurality of detection areas, and the plurality of resonators disposed in one of the plurality of detection areas comprise at least two types of resonators having at least two different wavelength characteristics, being disposed in each row of the pixel array in a direction in which a plurality of rows of the pixel array are arranged, and being connected to each other through the mirror.

2. The spectrometer of claim 1, wherein the plurality of couplers comprises:
  an in-coupler configured to receive light incident onto the photonics layer; and
  an out-coupler which is connected to the in-coupler and configured to output the light transmitted from the in-coupler to a corresponding pixel of the pixel array.

3. The spectrometer of claim 2, wherein the in-coupler and the out-coupler correspond to grating couplers, metal mirrors, or a grating coupler and a metal mirror.

4. The spectrometer of claim 1, wherein at least two couplers of the plurality of couplers are disposed apart from the plurality of resonators and arranged in succession in each row of the pixel array, and out-couplers of the at least two couplers in each row of the pixel array are located at same column positions.

5. The spectrometer of claim 4, wherein each of the plurality of couplers is disposed separately from the plurality of resonators to generate an evanescent coupling between the plurality of couplers and the plurality of resonators.

6. The spectrometer of claim 1, wherein the plurality of resonators are Fabry-Perot resonators.

7. The spectrometer of claim 1, wherein the at least two types of resonators are alternately arranged in each row of the pixel array.

8. The spectrometer of claim 1, wherein the mirrors that are respectively disposed at two ends of each of the plurality of resonators correspond to a first mirror and a second mirror that are respectively disposed at a starting point and an ending point of each of the plurality of resonators, and
  wherein positions of the first mirror and the second mirror are different in each of the plurality of rows while positions of the plurality of couplers are same in each of the plurality of rows, so that the plurality of resonators having different wavelength characteristic are arranged to have a scrambled layout in the plurality of rows.

9. An apparatus for measuring a substance in body, the apparatus comprising:
  a light source configured to emit light to an object; and a spectrometer configured to sense the light returning from the object, wherein the spectrometer comprises:
- a pixel array; and
- a photonics layer disposed on the pixel array and comprising a plurality of resonators, mirrors that are respectively disposed at two ends of each of the plurality of resonators, and a plurality of couplers disposed apart from and evanescently coupled to the plurality of resonators, wherein the photonics layer comprises a plurality of detection areas, and the plurality of resonators disposed in one of the plurality of detection areas comprise at least two types of resonators having at least two different wavelength characteristics, being disposed in each row of the pixel array in a direction in which a plurality of rows of the pixel array are arranged, and being connected to each other through the mirror.

10. The apparatus of claim 9, further comprising a signal processor configured to analyze a substance of the object using a signal sensed by the spectrometer.

11. The apparatus of claim 9, wherein the light source emits a near-infrared laser or a visible light laser.

12. The apparatus of claim 9, wherein the plurality of couplers comprises:
- an in-coupler configured to receive the light that is reflected from the object; and
- an out-coupler which is connected to the in-coupler and outputs the light transmitted from the in-coupler to a pixel of the pixel array.

13. The apparatus of claim 9, wherein at least two couplers of the plurality of couplers are arranged in each row of the pixel array so as to be aligned to a pixel pitch.

14. A spectrometer comprising:
a pixel array; and
a photonics layer that is disposed on the pixel array and comprises:
- an in-coupler that receives light;
- an out-coupler that outputs the light transmitted from the in-coupler;
- an evanescent coupler that is connected to the in-coupler and the out-coupler to guide the light received from the in-coupler to the out-coupler;
- a resonator that extends in a direction from the in-coupler to the out-coupler, and is disposed apart from the in-coupler, the out-coupler and the evanescent coupler to generate an evanescent coupling between the resonator and the evanescent coupler;
- a mirror that is disposed at two ends of the resonator, and wherein the photonics layer comprises a plurality of detection areas, and a plurality of resonators disposed in one of the plurality of detection areas comprise at least two types of resonators having at least two different wavelength characteristics, being disposed in each row of the pixel array in a direction in which a plurality of rows of the pixel array are arranged, and being connected to each other through the mirror.

15. The spectrometer of claim 14, wherein the evanescent coupler extends from the in-coupler to the out-coupler and curves so that distance between the resonator and the evanescent coupler varies.

16. The spectrometer of claim 14, wherein the photonics layer comprises a first coupler set and a second coupler set within a illumination pitch of the spectrometer,
the first coupler set comprises a first in-coupler, a first out-coupler, and a first evanescent coupler that respectively correspond to the in-coupler, the out-coupler, and the evanescent coupler,
the second coupler set comprises a second in-coupler, a second out-coupler, and a second evanescent coupler, and
the first coupler set and the second coupler set are disposed in series.

17. The spectrometer of claim 16, wherein the resonator corresponds to a first resonator, and
the photonics layer comprises:
the first resonator that is aligned with the first coupler set; and
a second resonator that is aligned with the second coupler set and disposed in series with the first resonator, and
the second resonator has a wavelength characteristic different from a wavelength characteristic of the first resonator.

* * * * *